United States Patent Office 2,890,322
Patented June 9, 1959

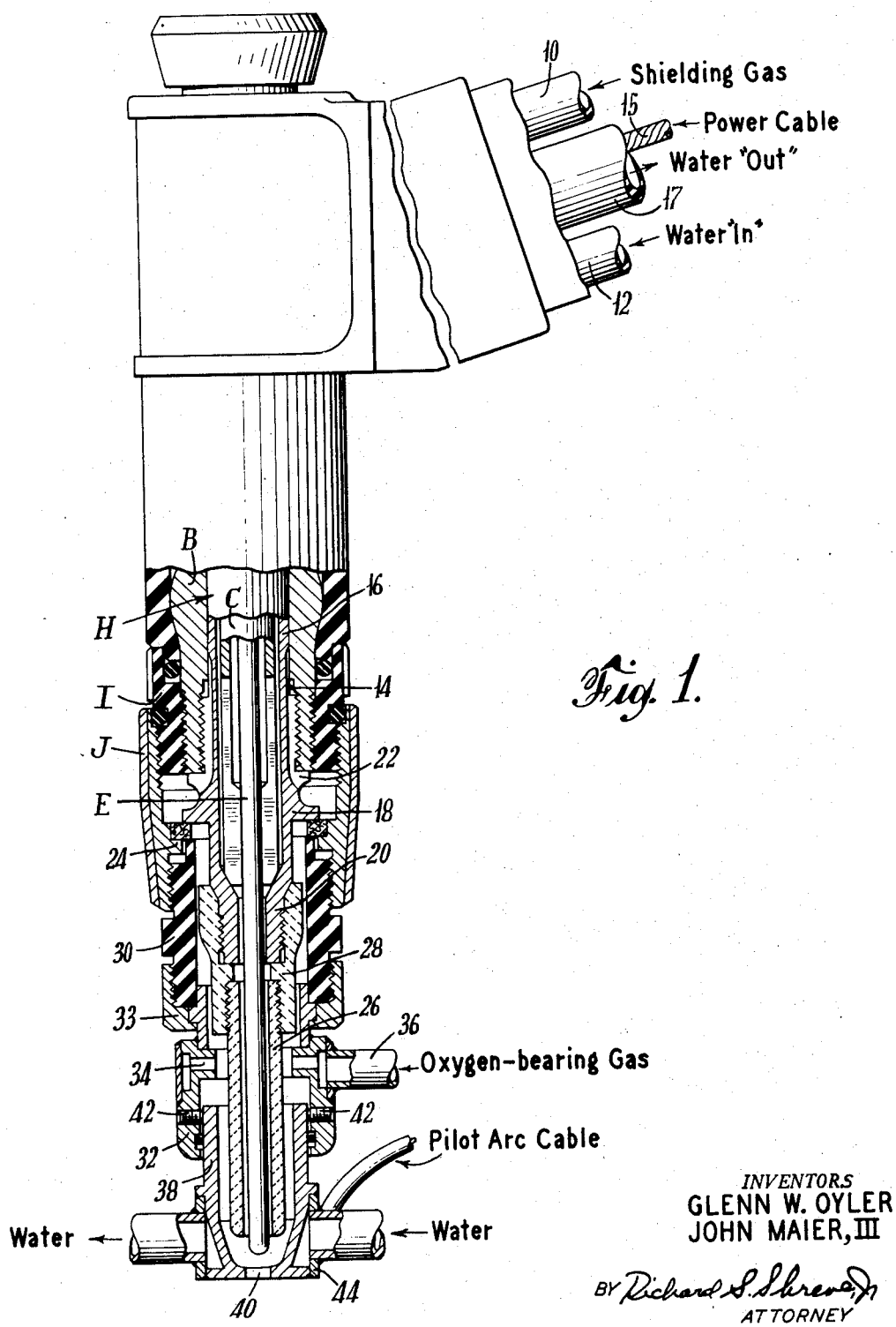

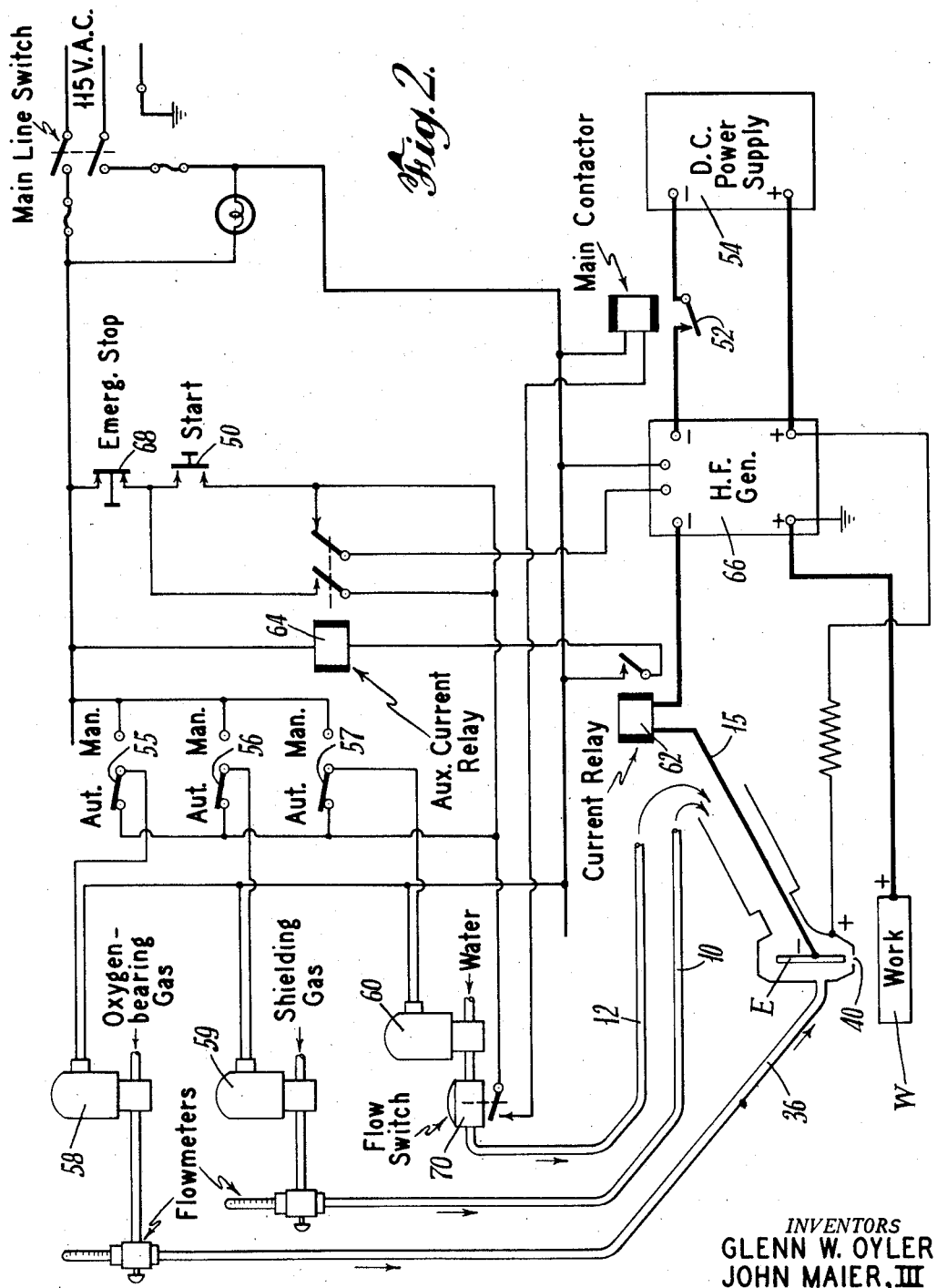

2,890,322
ARC TORCH AND PROCESS

Glenn W. Oyler, Springfield, and John Maier III, Newark, N.J., assignors to Union Carbide Corporation, a corporation of New York Application February 20, 1957, Serial No. 641,420

6 Claims. (Cl. 219—69)

This invention relates to arc torches and process of the character disclosed in the copending application of R. M. Gage, Serial No. 524,353, and has for its principal object to improve the apparatus and facilitate the process for the thermochemical removal, particularly cutting of metals.

In the aforesaid application, a high pressure arc is established between an electrode and a workpiece through a constricted orifice which wall-stabilizes a portion of the length of such arc to produce and control the shape and direction of an effluent between said orifice and said workpiece, an annular stream of shielding gas is passed along and beyond the electrode and through the arc constricting orifice, and the effluent from said orifice is applied to the workpiece.

A more specific object of the present invention is to pass a gas chemically active with respect to the workpiece through said arc constricting orifice to facilitate the cutting action while maintaining the electrode shielded by the stream of gas chemically inert with respect thereto.

According to the present invention a separate annular stream of gas chemically active with respect to the workpiece is passed along and outside of the shielding gas stream into direct contact with the shielding gas beyond the electrode to pass with the shielding gas through the arc constricting orifice.

The electrode is non-consumable, preferably of a refractory metal such as tungsten, and the shielding gas for protecting it from oxidation is preferably nitrogen, argon, helium or some mixture thereof. The chemically active gas to provide the high flow of gas and/or combustion necessary for cutting is preferably an oxygen-bearing gas such as air.

In order to obtain good quality cuts on some metals it is essential that hydrogen be added to the shielding gas. For example, the addition of hydrogen from 1 to 100% improves the kerf walls of aluminum and magnesium over that obtained using nitrogen, helium or argon independently, the best quality being obtained with about 50% hydrogen.

In the cutting of metals such as carbon steel, stainless steel, nickel and copper it is preferred to use nitrogen, argon or a mixture thereof as the shielding gas.

It is essential that the cross-sectional area of the annular space between the electrode and the shielding gas tube be so small that a high velocity jet stream is obtained with a low flow of shielding gas, in order to displace the cutting gas and thereby adequately protect the tip of the electrode from contamination.

The same applies to the distance that the electrode protrudes from the shielding gas tube, preferably about 5/32 inch. Another important distance is the setback of the electrode from the arc constricting orifice preferably about 1/8 inch. A substantially greater distance causes the arc to transfer to the metal forming the orifice before passing to the work, known as double-arcing.

It is important to preserve the alignment of the electrode concentric with the shielding tube, and the shielding tube concentric with the arc constricting orifice. Any substantial eccentricity will cause oxidation of the electrode, and cause one side of the kerf to be rough with attached dross.

In the drawings:

Fig. 1 is a side elevation partly in elevation of an arc torch according to and for carrying out the process according to the preferred embodiment of the present invention; and Fig. 2 is a circuit diagram of the controls for the operation of the process.

The torch comprises a body B having a base the lower end of which receives an electrode holder or collet body H. A collet C inside the holder H bears against an abutment in the top of the torch body B, and the holder H has a conical inner bottom surface to constrict the collet to grip the electrode E when the collet C is forced into the body B by applying pressure by the torch cap. An insulating ring I is screwed onto the inside of the bottom of the torch body B, and a water jacket W is screwed onto the outside of the insulation I.

The torch body B is the type shown in Behnke et al. Patent No. 2,385,632 and has an inlet 10 for shielding gas which opens into an annular chamber between the collet head and the top of the electrode holder H, from which the shielding gas flows down inside the holder and outside the collet, then in through the collet slots on through the bottom of the holder. The torch body B also has an inlet 12 for cooling water from which passages not shown lead to an annular groove 14 in the torch body. A lead-in conduit 15 for the welding current is extended through the water outlet hose 17, as shown in said patent.

The electrode holder or collet body H comprises an upper tubular portion 16 substantially coextensive with the collet, an intermediate collar portion 18 below the bottom of the torch body B and longer than the bore therein, and a boss 20 depending below the collar portion 18. Longitudinal grooves 22 formed in the tubular portion 16 and the collar portion 18 connect the torch body groove 14 with the space below the torch body B. The water jacket has an inner shoulder 24 which compresses a gasket against the bottom of the collar 18 to enclose a water chamber.

The shielding gas passage through the boss 20 is extended by a shielding gas tube 26, of refractory material such as diamonite, which is secured to the boss by a threaded adaptor coupling 28 preferably of refractory material such as lava. The inner diameter of the tube 26 is proportioned to the electrode diameter to provide a small cross-sectional area for the annular passage therebetween small enough to provide high velocity with small flow, such area preferably being less than that of the electrode. Surrounding the coupling 28 is an outer insulator adaptor coupling 30 which is screwed onto the bottom of the water jacket W. A nozzle insert holder assembly 32 is secured to the bottom of the coupling 30 by a nut 33. The assembly 32 is provided with an annular header 34 receiving chemically active gas through an inlet 36. A nozzle insert 38 fits inside the bottom of the holder assembly 32 with a clearance so that the constricted orifice 40 of the insert may be centered with respect to the electrode E and the shielding gas tube 26 by means of four equally angularly spaced set screws 42. The bottom of the nozzle insert adjacent the orifice 40 is preferably provided with a water jacket 44 of either O ring or silver-soldered construction.

The outer coupling 30 abuts the gasket under the collar portion 18, and together with the annular parts therebelow form a barrel to contain the chemically active gas which flows inwardly from the header 34 through two or more ports equally spaced therearound, and conduct it outside of the tube and inside the nozzle 38 to and out through the constricted orifice 40.

Referring to Fig. 2 when the start button 50 is pushed a circuit is completed through the coil of the main contactor 52 providing that flow switch 70 is closed. This completes a D.C. circuit between the negative terminal of the power supply 54 and the electrode, and places the open-circuit voltage of the power supply between the electrode E and the work W.

When the switches 55, 56, and 57 are in the automatic position, the switch 50 also completes a circuit to the solenoid coils of the valve 58 for the oxygen-bearing gas, the valve 59 for the shielding gas, and the valve 60 for the cooling water. Opening the valves 58 and 59 allows predetermined rates of flow of oxygen-bearing gas and shielding gas respectively to pass through the cutting torch orifice 40.

The switch 50 also completes a circuit through the normally closed contacts of auxiliary relay 64 to energize a high-frequency unit 66. The high-frequency power supply ionizes a path for the pilot-arc current between the electrode E and the torch cup and establishes the pilot arc. The ionized gas from the pilot arc provides a low resistance path for the cutting current between the electrode and the work and the main cutting arc is initiated.

Flow of cutting current energizes the coil of current relay 62 which in turn completes the circuit to the coil of auxiliary relay 64 which interrupts the A.C. power to the high-frequency generator 66. The normally open contact of the auxiliary relay 64 closes and by-passes the start push button 50. At this point the start push button may be released.

Cutting action may be stopped by the emergency stop push button 68, by running off the edge of the piece to be cut, by raising the torch, or by interruption or decrease of flow below the operating value of water flow switch 70.

What is claimed is:

1. Gas shielded arc torch comprising a torch body having a barrel, an electrode holder in said barrel, a gas separation tube below said holder concentric with the electrode, shielding gas passage means extending from an inlet in the torch body through the torch to the interior of said gas separation tube outside of the electrode, a gas directing nozzle extending below said gas separation tube and having an orifice small enough to constrict the arc from the electrode, said barrel having an annular chamber for supplying an annular stream of chemically active gas inside said nozzle and outside of said separator tube to surround the stream of electrode shielding gas and pass therewith through said constricted orifice, the cross-sectional area of the annular space between the electrode and the shielding gas tube is small enough to obtain a high velocity jet stream with a low flow of shielding gas.

2. Gas shielded arc torch comprising a torch body having a barrel, an electrode holder in said barrel, a gas separation tube below said holder concentric with the electrode, shielding gas passage means extending from an inlet in the torch body through the torch to the interior of said gas separation tube outside of the electrode, a gas directing nozzle extending below said gas separation tube and having an orifice small enough to constrict the arc from the electrode, said barrel having an annular chamber for supplying an annular stream of chemically active gas inside said nozzle and outside of said separator tube to surround the stream of electrode shielding gas and pass therewith through said constricted orifice, the cross-sectional area of the annular space between the electrode and the shielding gas tube is small enough to obtain a high velocity jet stream with a low flow of shielding gas and the electrode protruding from the shielding gas tube for a distance of about 5/32 inch, and the electrode being set back from the constricted orifice about 1/8 inch.

3. Gas shielded arc torch comprising a torch body having a barrel, an electrode holder in said barrel, a gas separation tube below said holder concentric with the electrode, shielding gas passage means extending from an inlet in the torch body through the torch to the interior of said gas separation tube outside of the electrode, a gas directing nozzle extending below said gas separation tube and having an orifice small enough to constrict the arc from the electrode, said barrel having an annular chamber for supplying an annular stream of chemically active gas inside said nozzle and outside of said separator tube to surround the stream of electrode shielding gas and pass therewith through said constricted orifice, in combination with lateral displacement means interposed between said barrel and nozzle for aligning said constricted orifice with the electrode thereabove.

4. Gas shielded arc torch comprising a torch body having a barrel, an electrode holder in said barrel, a gas separation tube below said holder concentric with the electrode, shielding gas passage means extending from an inlet in the torch body through the torch to the interior of said gas separation tube outside of the electrode, a gas directing nozzle extending below said gas separation tube and having an orifice small enough to constrict the arc from the electrode, said barrel having an annular chamber for supplying an annular stream of chemically active gas inside said nozzle and outside of said separator tube to surround the stream of electrode shielding gas and pass therewith through said constricted orifice, the cross-sectional area of the annular space between the electrode and the shielding gas tube is small enough to obtain a high velocity jet stream with a low flow of shielding gas, in combination with a nozzle insert holder assembly surrounding said gas separation tube, a nozzle insert fitted in said holder assembly, and a header in said holder assembly for supplying chemically active gas to said nozzle insert outside of said separation tube.

5. Gas shielded arc torch comprising a torch body having a barrel, an electrode holder in said barrel, a gas separation tube below said holder concentric with the electrode, shielding gas passage means extending from an inlet in the torch body through the torch to the interior of said gas separation tube outside of the electrode, a gas directing nozzle extending below said gas separation tube and having an orifice small enough to constrict the arc from the electrode, said barrel having an annular chamber for supplying an annular stream of chemically active gas inside said nozzle and outside of said separator tube to surround the stream of electrode shielding gas and pass therewith through said constricted orifice, the cross-sectional area of the annular space between the electrode and the shielding gas tube is small enough to obtain a high velocity jet stream with a low flow of shielding gas, in combination with a nozzle insert holder having a gas header therein and a water jacketed nozzle insert fitted in said insert holder.

6. Gas shielded arc torch comprising a torch body having a barrel, an electrode holder in said barrel, a gas directing nozzle carried by said barrel and extending below said electrode and having an orifice therebelow small enough to constrict the arc from the electrode, gas passage means extending from an inlet in said body through the torch to said constricted orifice, and lateral displacement means interposed between said barrel and said nozzle in angularly spaced relation for aligning said constricted orifice with said electrode thereabove.

References Cited in the file of this patent

UNITED STATES PATENTS

| | | |
|---|---|---|
| 2,428,849 | Kratz et al. | Oct. 14, 1947 |
| 2,512,707 | Anderson | June 27, 1950 |

FOREIGN PATENTS

| | | |
|---|---|---|
| 170,598 | Switzerland | Oct. 16, 1934 |